(12) United States Patent  
Zhang et al.

(10) Patent No.: US 10,097,808 B2  
(45) Date of Patent: Oct. 9, 2018

(54) IMAGE MATCHING APPARATUS AND METHOD THEREOF

(71) Applicant: Samsung Electronics Co., Ltd., Suwon-si (KR)

(72) Inventors: Hui Zhang, Beijing (CN); Yongjie Zhang, Beijing (CN); Fei Duan, Beijing (CN); Haoxing Wang, Beijing (CN); Jaejoon Han, Seoul (KR); Jungbae Kim, Seoul (KR); Meng Ye, Beijing (CN); Seon Min Rhee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 123 days.

(21) Appl. No.: 15/019,046

(22) Filed: Feb. 9, 2016

(65) Prior Publication Data

US 2016/0234474 A1 Aug. 11, 2016

(30) Foreign Application Priority Data

Feb. 9, 2015 (CN) .......................... 2015 1 0066534  
Nov. 2, 2015 (KR) ........................ 10-2015-0153291

(51) Int. Cl.  
*G06K 9/00* (2006.01)  
*H04N 13/128* (2018.01)  
(Continued)

(52) U.S. Cl.  
CPC ........... *H04N 13/128* (2018.05); *G06T 7/593* (2017.01); *H04N 13/271* (2018.05); *H04N 2013/0081* (2013.01)

(58) Field of Classification Search  
CPC ........... G06T 7/593; G06T 2207/10028; G06T 15/205; H04N 13/0271; H04N 13/0022; H04N 13/0018; H04N 2013/0081  
See application file for complete search history.

(56) References Cited

U.S. PATENT DOCUMENTS

2011/0050864 A1* 3/2011 Bond .................... H04N 13/026  
348/51  
2011/0304618 A1* 12/2011 Chen .................. H04N 13/0022  
345/420

(Continued)

FOREIGN PATENT DOCUMENTS

KR 10-2014-0076085 A 6/2014

OTHER PUBLICATIONS

Morse, B. et al, "Patchmatch-based content completion of stereo image pairs," 2012 Second International Conference on 3D Imaging, Modeling, Processing, Visualization and Transmission (3DIMPVT), IEEE, 2012 (8 pages in English).

(Continued)

*Primary Examiner* — Yon Couso  
(74) *Attorney, Agent, or Firm* — NSIP Law

(57) ABSTRACT

An apparatus and corresponding method are provided to match images and include assigning depth candidate values to a pixel in a first image, and reassigning third depth candidate values to a first pixel in the first image based on first depth candidate values assigned to the first pixel and second depth candidate values assigned to a second pixel adjacent to the first pixel. The apparatus and method also include determining one of the third depth candidate values to be a depth value of the first pixel, and matching the first pixel and a third pixel in a second image corresponding to the determined depth value of the first pixel.

20 Claims, 15 Drawing Sheets

(51) Int. Cl.
   *H04N 13/271* (2018.01)
   *G06T 7/593* (2017.01)
   *H04N 13/00* (2018.01)

(56) References Cited

U.S. PATENT DOCUMENTS

| | | |
|---|---|---|
| 2012/0014590 A1* | 1/2012 | Martinez-Bauza ........................ H04N 13/0271 382/154 |
| 2012/0163672 A1* | 6/2012 | McKinnon ............ G06T 7/0075 382/106 |
| 2012/0293488 A1 | 11/2012 | Niu |
| 2015/0294473 A1* | 10/2015 | Michot .................. G06T 5/005 382/154 |

OTHER PUBLICATIONS

Zheng, E. et al., "PatchMatch based joint view selection and depthmap estimation," 2014 IEEE Conference on Computer Vision and Pattern Recognition (CVPR), IEEE, 2014 (8 pages in English).

\* cited by examiner

IMAGE MATCHING APPARATUS AND METHOD THEREOF

CROSS-REFERENCE TO RELATED APPLICATION(S)

This application claims the benefit under 35 USC 119(a) of Chinese Patent Application No. 201510066534.9, filed on Feb. 9, 2015, in the Chinese Patent Office, and Korean Patent Application No. 10-2015-0153291, filed on Nov. 2, 2015, in the Korean Intellectual Property Office, the entire disclosures of which are incorporated herein by reference for all purposes.

BACKGROUND

1. Field

The following description relates to a method and apparatus to match images, and more particularly, to a method and apparatus to match images based on calculated depth values of pixels in the images.

2. Description of Related Art

Three-dimensional (3D) display technology includes 3D image generation technology and display device technology. In a method that generates a 3D image, images of a same scene are acquired from a plurality of viewpoints, and 3D information of the scene is obtained by detecting a correspondence between pixels from the different images using triangulation.

The method to generate a 3D image primarily includes image acquisition, camera parameter measurement, 3D matching, and 3D remodeling. The 3D matching is performed to calculate a viewpoint difference, also referred to as a depth, between two corresponding pixels.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In accordance with an embodiment, there is provided an image matching method, including: assigning depth candidate values to a pixel in a first image; reassigning third depth candidate values to a first pixel in the first image based on first depth candidate values assigned to the first pixel and second depth candidate values assigned to a second pixel adjacent to the first pixel; determining one of the third depth candidate values to be a depth value of the first pixel; and matching the first pixel and a third pixel in a second image corresponding to the determined depth value of the first pixel.

The method may also include determining a range of a depth value of the pixel in the first image and the second image.

A number of the third depth candidate values may be equal to a number of the second depth candidate values.

The determining of the range of the depth value may include: determining a minimum value and a maximum value of the range of the depth value; and determining a sampling interval of the depth value.

The determining of the range of the depth value may be based on structure characteristics of the first image and the second image.

The assigning may include randomly assigning depth values within the range of the depth value to the pixel as the depth candidate values.

The reassigning may include: generating a set of depth candidate values for the first pixel based on the first depth candidate values and the second depth candidate values; calculating matching costs for the set of depth candidate values; determining the third depth candidate values based on the matching costs; and reassigning the third depth candidate values to the first pixel.

In response to the first pixel being positioned at an edge of the first image, the set of depth candidate values may include M depth candidate values assigned to the first pixel and N depth candidate values assigned to the second pixel, and the set may include a maximum of M+N elements.

In response to two second pixels being adjacent to the first pixel, the set of depth candidate values may include M depth candidate values assigned to the first pixel, and N depth candidate values assigned to each of the second pixels, and the set may include a maximum of M+2*N elements.

The determining of the third depth candidate values may be performed in an ascending order of the calculated matching costs.

The calculating may include: determining pixels corresponding to the first pixel in the second image with respect to each of the set of depth candidate values; setting a reference area including the first pixel in the first image; setting target areas including the corresponding pixels; and calculating a matching cost between the reference area and each of the target areas.

The calculating of the matching cost between the reference area and each of the target areas may include calculating a matching degree between texture characteristics of the reference area and each of the target areas.

The calculating of the matching cost between the reference area and each of the target areas may include calculating a similarity in distribution of a color value or a gray value between the reference area and each of the target areas.

The setting of the target areas may include determining a size of a target area based on a preset parallel movement amount.

The calculating of the matching cost between the reference area and each of the target areas may include: determining a sub-target area with respect to a first target area; calculating a matching cost for the sub-target area; and determining a single matching cost for the first target area based on the calculated matching cost.

The method may also include iteratively reassigning depth candidate values to another pixel adjacent to the first pixel.

The iteratively reassigning may be performed with respect to all pixels in the first image in a first scan order.

The first scan order may be one of a left-to-right row sequential scan order, a right-to-left row sequential scan order, a top-to-bottom column sequential scan order, and a bottom-to-top column sequential scan order.

In response to termination of the first scan order, the iteratively reassigning may be performed with respect to all pixels in the first image in a second scan order.

The second scan order may be different from the first scan order.

The determining of the one of third depth candidate values to be the depth value of the first pixel may include an energy function.

In accordance with an embodiment, there is provided a non-transitory computer-readable storage medium including a program including instructions to cause a computer to perform the method described above.

In accordance with an embodiment, there is provided an image matching apparatus, including: a storage configured to store a first image and a second image; and a processor configured to assign depth candidate values to a pixel in a first image, reassign third depth candidate values to a first pixel in the first image based on first depth candidate values assigned to the first pixel and second depth candidate values assigned to a second pixel adjacent to the first pixel, determine one of the third depth candidate values to be a depth value of the first pixel, and match the first pixel and a third pixel in a second image corresponding to the determined depth value of the first pixel.

In accordance with another embodiment, there is provided a method to generate a depth map of a three-dimensional (3D) image, the method including: assigning depth candidate values to a pixel in a first image; reassigning third depth candidate values to a first pixel in the first image based on first depth candidate values assigned to the first pixel and second depth candidate values assigned to a second pixel adjacent to the first pixel; determining one of the reassigned third depth candidate values to be a depth value of the first pixel; and generating a depth map with respect to the first image and a second image based on the depth value of the first pixel.

Other features and aspects will be apparent from the following detailed description, the drawings, and the claims.

Figure 1:
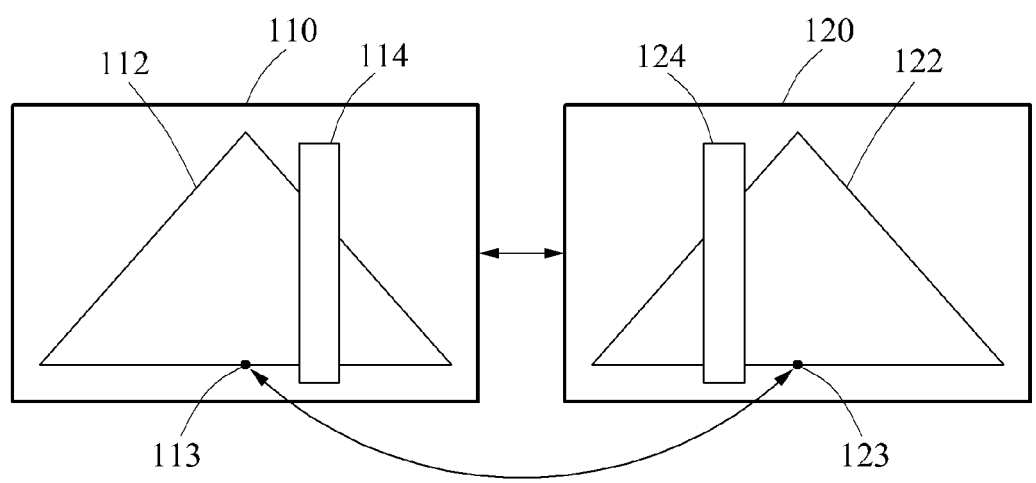
FIG. 1 is a diagram illustrating three-dimensional (3D) images being matched, in accordance with an embodiment.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Hereinafter, reference will now be made in detail to examples with reference to the accompanying drawings, wherein like reference numerals refer to like elements throughout.

Various alterations and modifications may be made to the examples. Here, the examples are not construed as limited to the disclosure and should be understood to include all changes, equivalents, and replacements within the idea and the technical scope of the disclosure.

The terminology used herein is for the purpose of describing particular examples only and is not to be limiting of the examples. As used herein, the singular forms "a", "an", and "the" are intended to include the plural forms as well, unless the context clearly indicates otherwise. It will be further understood that the terms "include/comprise" and/or "have" when used in this specification, specify the presence of stated features, integers, steps, operations, elements, components, and/or combinations thereof, but do not preclude the presence or addition of one or more other features, numbers, steps, operations, elements, components, and/or groups thereof.

Unless otherwise defined, all terms including technical and scientific terms used herein have the same meaning as commonly understood by one of ordinary skill in the art to which examples belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

When describing the examples with reference to the accompanying drawings, like reference numerals refer to like constituent elements and a repeated description related thereto will be omitted. When it is determined detailed description related to a related known function or configuration they may make the purpose of the examples unnecessarily ambiguous in describing the examples, the detailed description will be omitted here.

FIG. 1 is a diagram illustrating three-dimensional (3D) images being matched, in accordance with an embodiment.

Image matching between input images is performed to generate an image with respect to a virtual viewpoint, rather than an actual photographing viewpoint. The image matching is performed by setting a pixel correspondence between images being captured at different angles or viewpoints. For example, a pixel 113 in a first image 110 and a pixel 123 in a second image 120 are set to have a correspondence.

Input images are images acquired by photographing the same scene from different angles or viewpoints at the same time. For example, the first image 110 is a left image and the second image 120 is a right image. The first image 110 and the second image 120 correspond to a three-dimensional (3D) image pair.

The first image 110 and the second image 120 are images acquired by photographing identical backgrounds 112 and 122 and identical foregrounds 114 and 124. A foreground is positioned before a background. Thus, in a case in which photographing viewpoints are different, a positional change in the foreground is greater than a positional change in the background in images because the foreground is in front-of, ahead of, or before the background.

A depth of the foreground 114 in the image causes a disparity between the first image 110 and the second image 120. A correspondence between the pixel 113 and the pixel 123 is estimated based on such disparity. Hereinafter, a method to estimate a depth value of a pixel and matching images based on the estimated depth value will be described in detail with reference to FIGS. 2 through 15.

Although FIG. 1 illustrates a correspondence with respect to a single pixel, examples are not limited thereto. In other words, a person skilled in the relevant art will appreciate that a plurality of pixels between the first image 110 and the second image 120 may be processed as the pixel 113 and the pixel 123, for each image 110 and 120, respectively. Furthermore, although the pixel 113 and the pixel 123 are positioned at a base of the identical backgrounds 112 and 122, a person skilled in the relevant art will appreciate that the pixels 113 and 123 may be positioned at different, but corresponding, locations of the identical backgrounds 112 and 122.

Figure 2:
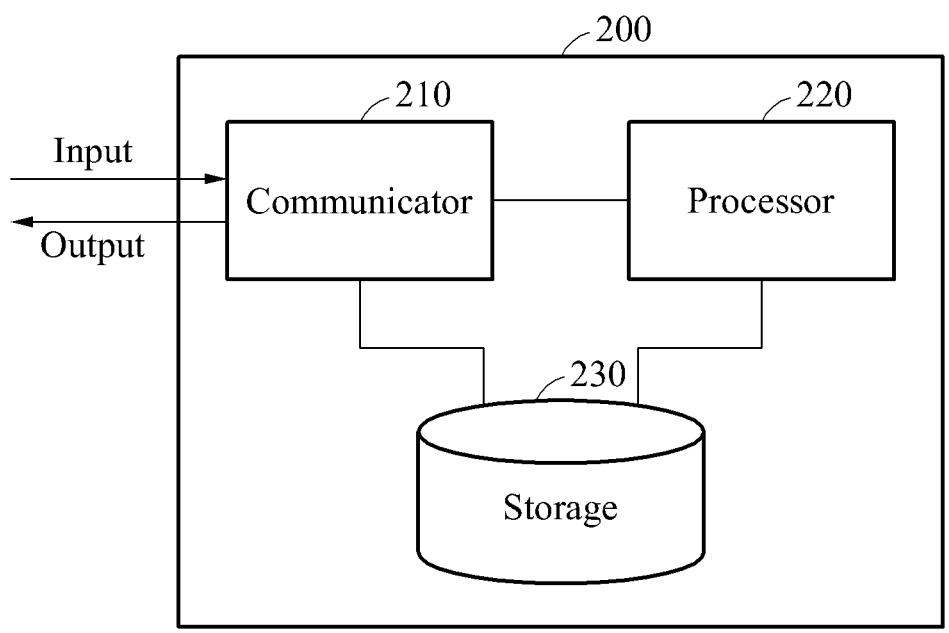
FIG. 2 is a block diagram illustrating an image matching apparatus, in accordance with an embodiment.

FIG. 2 is a block diagram illustrating an image matching apparatus, in accordance with an embodiment.

Referring to FIG. 2, an image matching apparatus 200 includes the following structural devices: a communicator 210, a processor 220, and a storage 230. Although each of the structural devices are illustrated as individual structural devices, in an alternative embodiment, a person skilled in the art will appreciate that all of the structural devices may be combined into a single structural processor or controller. Furthermore, although the storage 230 is illustrated to be part of the image matching apparatus 200, a person skilled in the art will appreciate that such storage 230 may be external to the image matching apparatus 200.

The communicator 210 receives input images from an external device.

The processor 220 processes data received at the communicator 210 and data stored in the storage 230.

The storage 230 stores the data received at the communicator 210 and the data processed by the processor 220. For example, the storage 230 stores one or more images received at the communicator 210.

The functions performed at the communicator 210, the processor 220, and the storage 230 will be described in detail with reference to FIGS. 3 through 15.

Figure 3:
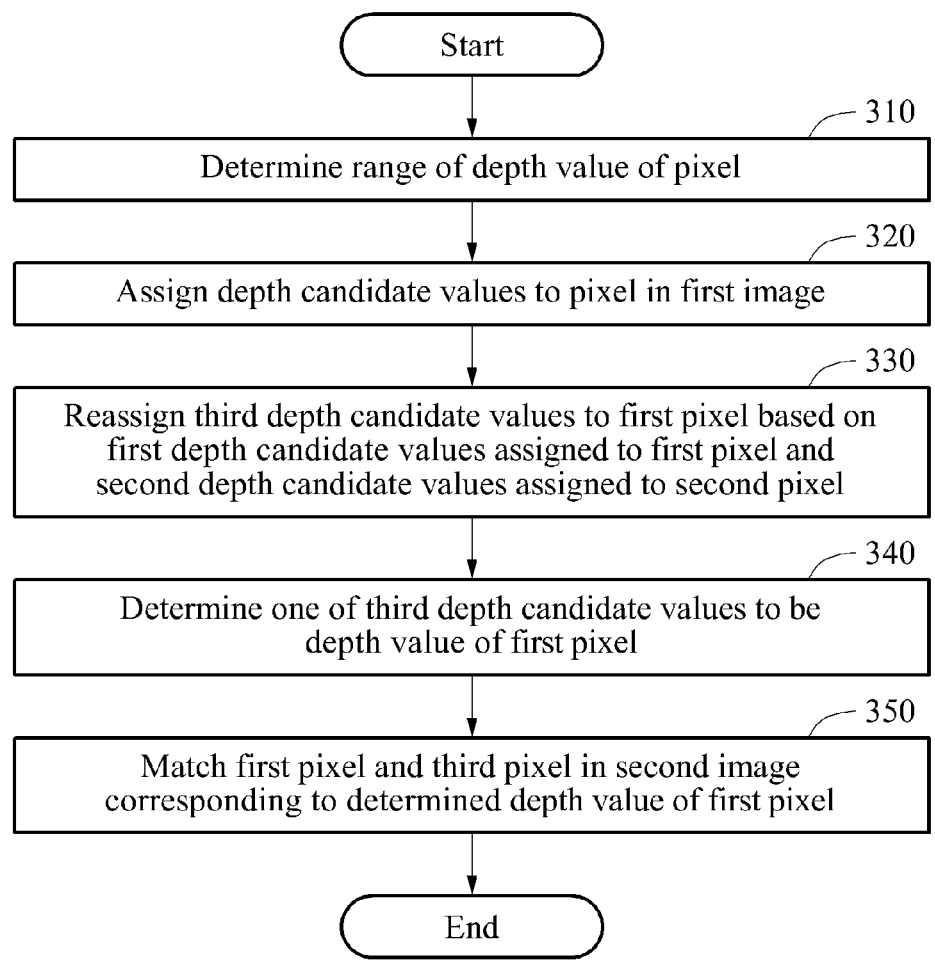
FIG. 3 is a flowchart illustrating an image matching method, in accordance with an embodiment.

FIG. 3 is a flowchart illustrating an image matching method, in accordance with an embodiment.

Operations 310, 320, 330, 340, and 350 of FIG. 3 relate to a method to match images by determining a pixel in a second image, the pixel corresponding to a pixel in a first image.

In advance of operation 310, the storage 230 stores the first image and the second image. As another example, in advance of operation 310, the communicator 210 receives the first image and the second image from another device.

Hereinafter, examples are described based on the first image and the second image. However, the examples are not limited to the two images and also applicable to at least two images. A person of ordinary skill in the relevant art will appreciate that multiple images may be concurrently processed based on the configuration of FIGS. 3 through 15.

Referring to FIG. 3, in operation 310, the processor 220 determines a range of a depth value to be assigned to the pixel in the first image.

The processor 220 generates L depth values by sampling the determined range of the depth value at predetermined intervals. L is a natural number.

A method of determining a range of a depth value will be described in detail below with reference to FIG. 4.

In operation 320, the processor 220 assigns a plurality of depth candidate values to a first pixel in the first image. For example, M depth candidate values are assigned to the pixel in the first image. M is a natural number.

The processor 220 assigns M depth values, among L depth values, to the pixel of the first image as the depth candidate values. For example, the processor 220 randomly assigns the M depth candidate values to the first pixel. The M depth candidate values may be initial depth candidate values.

Figure 5:
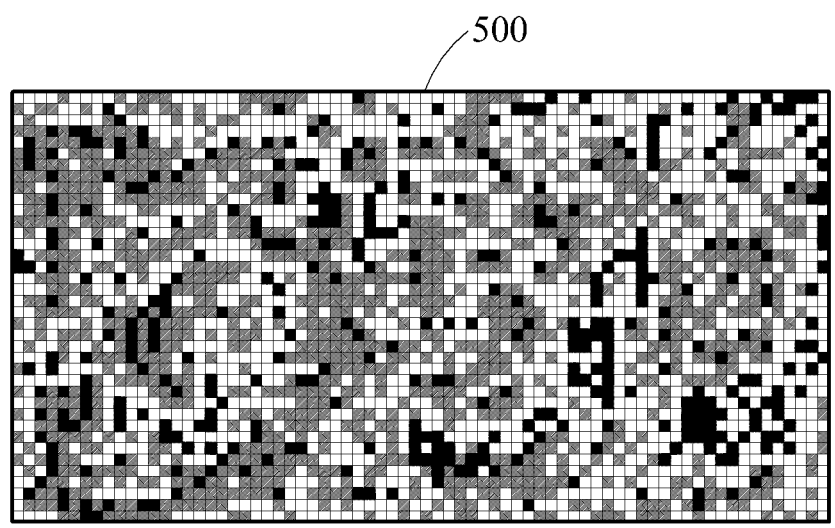
FIG. 5 illustrates an image in which depth candidate values are assigned to pixels, in accordance with an embodiment.

A depth map in which depth candidate values are randomly assigned to pixels in a first image is illustrated in FIG. 5, which will be described later.

Although operation 320 is performed with respect to the first image, operation 320 may also be performed with respect to the second image.

In operation 330, the processor 220 reassigns a plurality of third depth candidate values to the first pixel in the first image based on a plurality of first depth candidate values assigned to the first pixel and a plurality of second depth candidate values assigned to a second pixel, which are adjacent to the first pixel.

A plurality of second pixels are adjacent to the first pixel. For example, the second pixel in operation 330 is a pixel that has been already reassigned a depth candidate value. A pixel yet to be reassigned a depth candidate value, based on a processing order, is not the second pixel adjacent to the first pixel, although such pixel is positioned adjacent to the first pixel.

For example, a number of the first depth candidate values is M, a number of the second depth candidate values is N, and a number of the third depth candidate values is N. N is a natural number that is less than or equal to M and greater than or equal to "2". For example, M is "5" and N is "3".

A range of the second pixel adjacent to the first pixel is preset. For example, a pixel directly adjacent to the first pixel is the second pixel. In another example, a pixel positioned within a predetermined distance from the first pixel is the second pixel.

A robustness, clarity, and quality of image matching is maintained by maintaining a number of depth candidate values with respect to a single pixel.

Operation 330 is iteratively, recurrently, or continuously performed with respect to pixels or, in the alternative, to each of the pixels in the first image. In response to depth candidate values being reassigned to a predetermined pixel, a subsequent pixel is processed based on the processing order or a scan order. An association in geometric positions between adjacent pixels or an arrangement and identification of the adjacent pixels is maintained by propagating a depth candidate value reassigned to a pixel to the subsequent pixel to be processed.

A processing order of pixels in a first image and a second pixel adjacent to the first pixel will be described in detail with reference to FIGS. 12 through 14.

A method to reassign the third depth candidate values to the first pixel will be described in detail with reference to FIGS. 6 through 11.

Although operation 330 is performed with respect to the first image, operation 330 may also be performed with respect to the second image.

In operation 340, the processor 220 determines one of the reassigned third depth candidate values to be the depth value of the first pixel. In an example, the determined one depth value is an optimal depth value.

A method to determine the one of the third depth candidate values to be a depth value of a first pixel is not limited to particular examples.

The processor 220 determines one optimal depth value among the third depth candidate values using global constraints, such as energy consumption, efficiency, and processing time. In one example, the processor 220 generates an energy function, and determines the optimal depth value based on the generated energy function. A depth candidate value having a maximum value or a minimum value of the energy function is determined to be the optimal depth value.

The processor 220 generates the energy function using at least one of dynamic programming, image division, artificial intelligence, for example, a neural network or a genetic algorithm, and reliability propagation.

In operation 350, the processor 220 matches the first pixel and a third pixel in the second image corresponding to the determined depth value of the first pixel.

The processor 220 matches the first image and the second image based on matching of the first pixel and the third pixel.

As a result, the processor 220 is configured to match plurality of pixels in the first image to a plurality of pixels in the second image. The processor 220 matches the first image and the second image based on the matched pixels.

Figure 4:
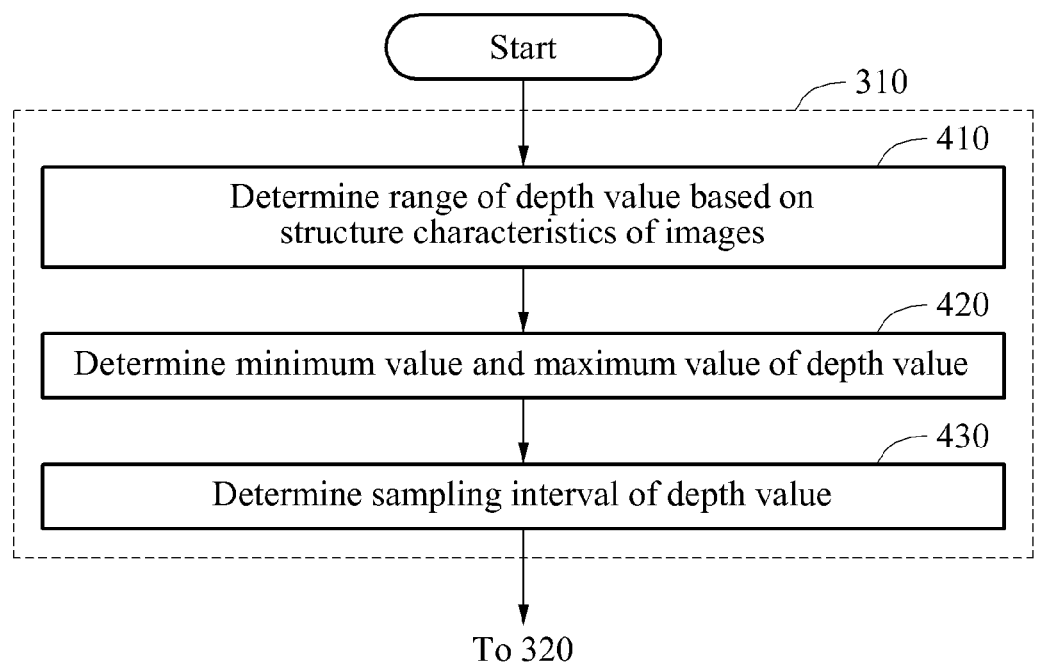
FIG. 4 is a flowchart illustrating a method to determine a range of a depth value of a pixel, in accordance with an embodiment.

FIG. 4 is a flowchart illustrating a method to determine a range of a depth value of a pixel in a first image and a second image, in accordance with an embodiment.

Referring to FIG. 4, operation 310 of FIG. 3 includes operations 410, 420, and 430.

In operation 410, the processor 220 determines a range of a depth value of the pixel included in the first image and the second image based on characteristics of the first image and the second image. For example, the range of the depth value is determined to be 1,000,000. Examples are not limited to this range value. Other range values of the depth value may be greater than 1,000,000 or less than 1,000,000.

The processor 220 determines the range of the depth value based on a gray gradient correspondence between adjacent pixels in at least one of the first image and the second image.

The processor 220 determines the range of the depth value based on structure characteristics of at least one of the first image and the second image. The structure characteristics include a texture, an edge, and an intersection point of the edge.

In operation 420, the processor 220 determines a minimum value and a maximum value of the depth value. For example, the processor 220 determines the minimum value and the maximum value of the depth value based on image characteristics of the first image and the second image. In some examples, the minimum value is a negative value and in other examples, the minimum value is a positive value. In other examples, the minimum value is a negative value and the maximum value is a positive value. In further examples, the minimum value and the maximum values are positive values.

In operation 430, the processor 220 determines a sampling interval of the depth value.

The processor 220 determines the sampling interval based on a size of data to be assigned to represent the depth value. For example, in a case in which a size of data to be used to express a depth value of a single pixel corresponds to 8 bits, 256 depth values are expressed using 8-bit data. The processor 220 determines the sampling interval so that a number of the sampled depth values is less than or equal to 256.

For example, when the range of the depth value is determined to be 1,000,000, the minimum value is −5,000, the maximum value is 995,000, and the size of the data is 8 bits, the sampling interval is determined to be 5,000. In a case in which the sampling interval is 5,000, the number of the sampled depth values is 200 and, as a result, the depth values are expressed using 8-bit data.

At operations 410 through 430, the processor 220 determines depth candidate values to be assigned to a pixel.

FIG. 5 illustrates an image in which depth candidate values are assigned to pixels, in accordance with an embodiment.

Referring to FIG. 5, a first image 500 includes a plurality of pixels.

By performing operation 320 of FIG. 3, a plurality of depth candidate values are assigned to each pixel.

In FIG. 5, the first image 500 illustrates a random value among the plurality of depth candidate values assigned to each pixel. A pixel with a relatively bright color indicates that a relatively small depth value is assigned to the pixel, and a pixel with a relatively dark color indicates that a relatively great depth value is assigned to the pixel.

The first image 500 illustrates one of the depth candidate values assigned to a first pixel. However, the depth candidate values are assigned to other pixels.

Figure 6:
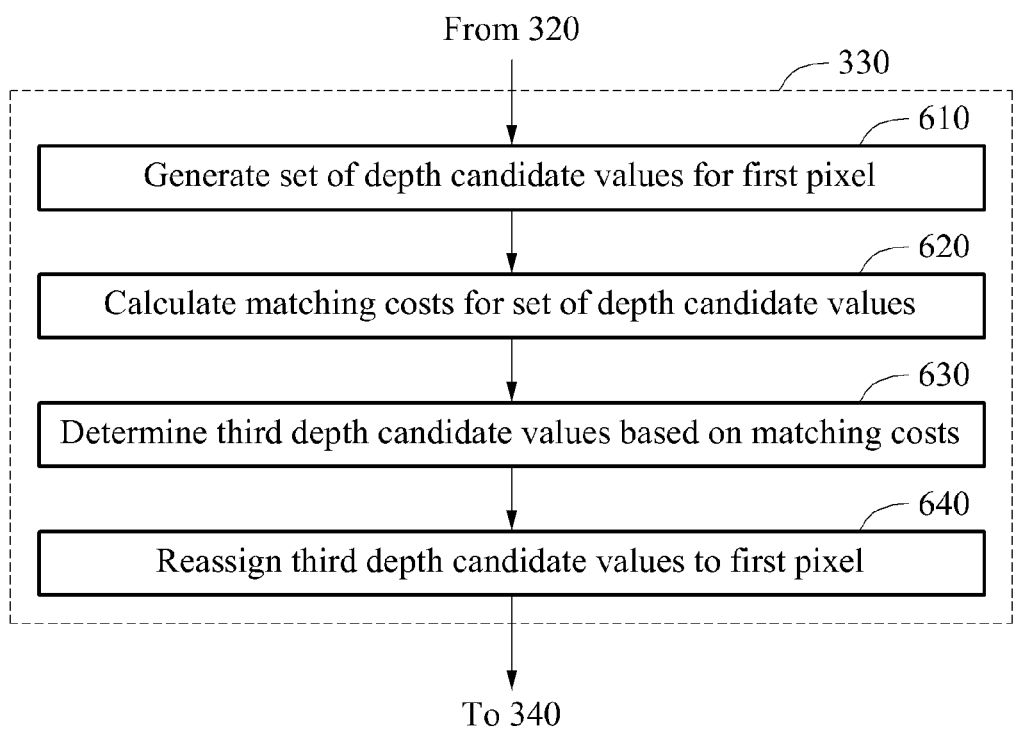
FIG. 6 is a flowchart illustrating a method to reassign depth candidate values to a pixel, in accordance with an embodiment.

FIG. 6 is a flowchart illustrating a method to reassign depth candidate values to a pixel, in accordance with an embodiment.

Referring to FIG. 6, operation 330 of FIG. 3 includes operations 610, 620, 630, and 640.

In operation 610, the processor 220 generates a set of depth candidate values for the first pixel.

The processor 220 generates the set of depth candidate values for the first pixel based on the first depth candidate values, for example, M first depth candidate values, assigned to the first pixel, and the second depth candidate values, for example, N second depth candidate values, assigned to a second pixel adjacent to the first pixel. The second depth candidate values assigned to the second pixel are values that were reassigned to the second pixel after performing operation 330 (FIG. 3) on the second pixel.

For example, based on a scan order or a processing order, the first pixel is a pixel that is first processed first, but the second pixel does not exist. In this instance in which the second pixel does not exist, the set of depth candidate values includes M depth candidate values assigned to the first pixel. Also, in this instance in which the second pixel does not exist, the set includes M elements.

As another example, when the first pixel is positioned on an edge of the first image, a single second pixel exists. In this instance in which a single second pixel exists, the set of depth candidate values includes M depth candidate values assigned to the first pixel and N depth candidate values assigned to the second pixel. Also, in this instance in which a single second pixel exists, the set includes a maximum of M+N elements.

As still another example, two second pixels are adjacent to the first pixel. In this instance in which two second pixels exist, the set of depth candidate values includes M depth candidate values assigned to the first pixel, and N depth candidate values assigned to each of the second pixels. In this case in which the two second pixels exist, the set includes a maximum of M+2*N elements.

In operation 620, the processor 220 calculates matching costs for the set of depth candidate values.

A method of calculating matching costs will be described in detail with reference to FIGS. 7 through 9.

In operation 630, the processor 220 determines the third depth candidate values based on the calculated matching costs. In an example, a number of the third depth candidate values is equal to a number of the second depth candidate values.

The processor 220 determines the third depth candidate values in an ascending order of the calculated matching costs. However, a person of skill in the art will appreciate that the determination of the third depth candidate values may be in a different order to the calculated matching costs, for instance, the third depth candidate values may be determined in a descending order of the calculated matching costs.

In operation 640, the processor 220 reassigns the determined third depth candidate values to the first pixel.

Figure 7:
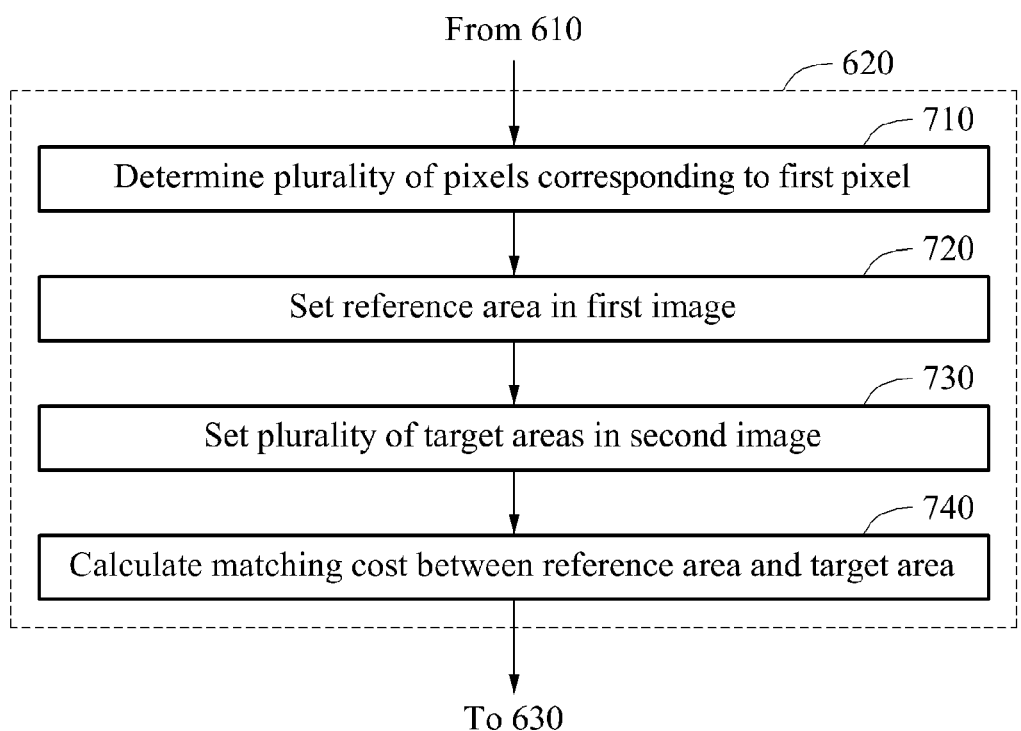
FIG. 7 is a flowchart illustrating a method to calculate matching costs for a set of depth candidate values, in accordance with an embodiment.

FIG. 7 is a flowchart illustrating a method to calculate matching costs for a set of depth candidate values, in accordance with an embodiment.

Referring to FIG. 7, operation 620 of FIG. 6 includes operations 710, 720, 730, and 740.

In operation 710, the processor 220 determines pixels corresponding to a first pixel in a second image, with respect to a set of depth candidate values. For example, in a case in which the set of depth candidate values includes a plurality of depth candidate values, a plurality of corresponding pixels are determined.

A method to determine corresponding pixels will be described in detail with reference to FIG. 8.

In operation 720, the processor 220 sets a reference area in the first image.

The processor 220 defines a reference area including the first pixel in the first image. For example, a size of the reference area may be 3×3. In another example, the size and a shape of the reference area are randomly determined. The size of the reference area is preset, for instance, based on a calculation speed of the image matching apparatus 200. Other factors may be considered to define the size of the reference area, such as energy efficiency, desired resolution, and robustness of the image matching apparatus 200.

In operation 730, the processor 220 sets target areas including pixels in the second image.

The processor 220 determines a size of a target area based on a preset parallel movement amount, for example, a maximum parallel movement amount.

A target area will be described in detail with reference to FIGS. 9 and 11.

In operation 740, the processor 220 calculates a matching cost between the reference area and each of the target areas.

For example, the processor 220 calculates a matching degree between texture characteristics of the reference area and each of the target area as the matching cost.

As another example, the processor 220 calculates a similarity in distribution of a color value or a gray value between the reference area and each of the target areas as the matching cost.

A method to calculate a matching cost between a reference area and each target area will be described in detail with reference to FIGS. 10 and 11.

Figure 8:
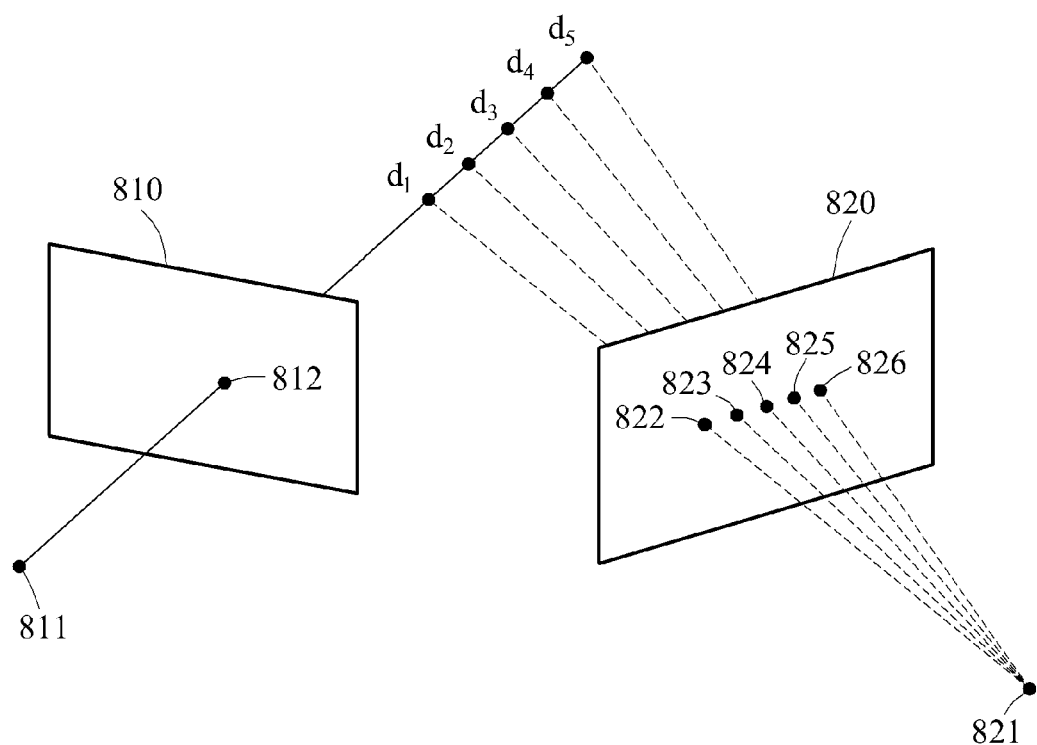
FIG. 8 illustrates a method to determine a plurality of corresponding pixels, in accordance with an embodiment.

FIG. 8 illustrates a method to determine corresponding pixels, in accordance with an embodiment.

Referring to FIG. 8, a depth value of a first pixel 812 is positioned on a straight line connecting the first pixel 812 and a first viewpoint 811. The first viewpoint 811 is a viewpoint from which a first image 810 is generated. A set with respect to the first pixel 812 includes depth candidate values $d_1$, $d_2$, $d_3$, $d_4$, and $d_5$.

Corresponding pixels 822, 823, 824, 825, and 826 are positioned on respective straight lines connecting the depth candidate values $d_1$, $d_2$, $d_3$, $d_4$, and $d_5$ and a second viewpoint 821.

The processor 220 determines the corresponding pixels 822, 823, 824, 825, and 826 of the first pixel 812 based on parameters of the first image 810, parameters of a second image 820, and an epipolar restriction condition. The epipolar restriction condition establishes the relationship between two 3D points seen from different views.

For example, the parameters of the first image 810 include coordinates of a camera used to photograph the first image 810, and angular information with respect to a photographing direction.

In a case in which the first image 810 and the second image 820 are photographed at a same height, a same roll angle, and a same pitch angle, the first image 810 and the second image 820 have different yaw angles. In a case in which the first image 810 and the second image 820 differ from each other in terms of the yaw angles only, corresponding pixels are construed as being parallel-translated in an x-axial direction in the second image 820.

Figure 9:
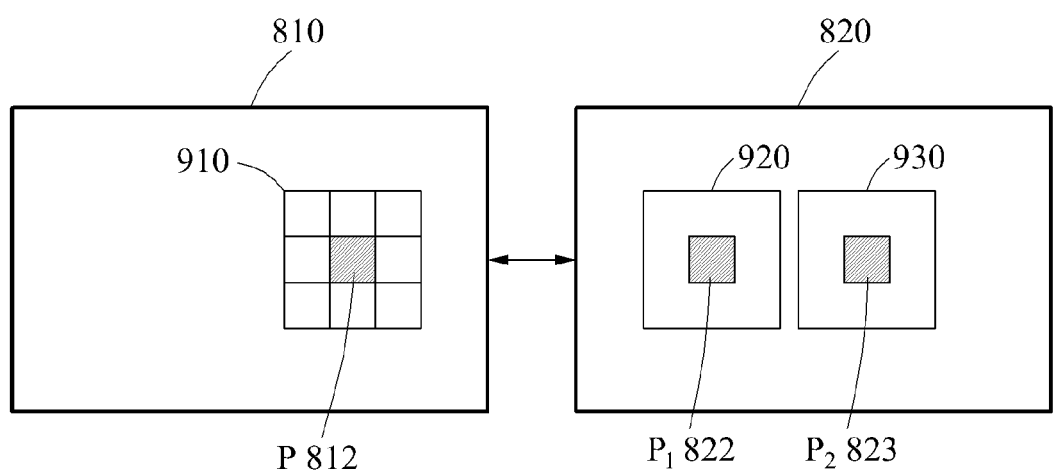
FIG. 9 illustrates a reference area and target areas, in accordance with an embodiment.

FIG. 9 illustrates a reference area and target areas, in accordance with an embodiment.

Referring to FIG. 9, a reference area 910 is set to include the first pixel P 812 in the first image 810, at a center of the reference area 910.

Target areas 920 and 930 are set to include respective corresponding pixels $P_1$ 822 and $P_2$ 823 in the second image 820.

A target area will be described in detail with reference to FIGS. 10 and 11.

Figure 10:
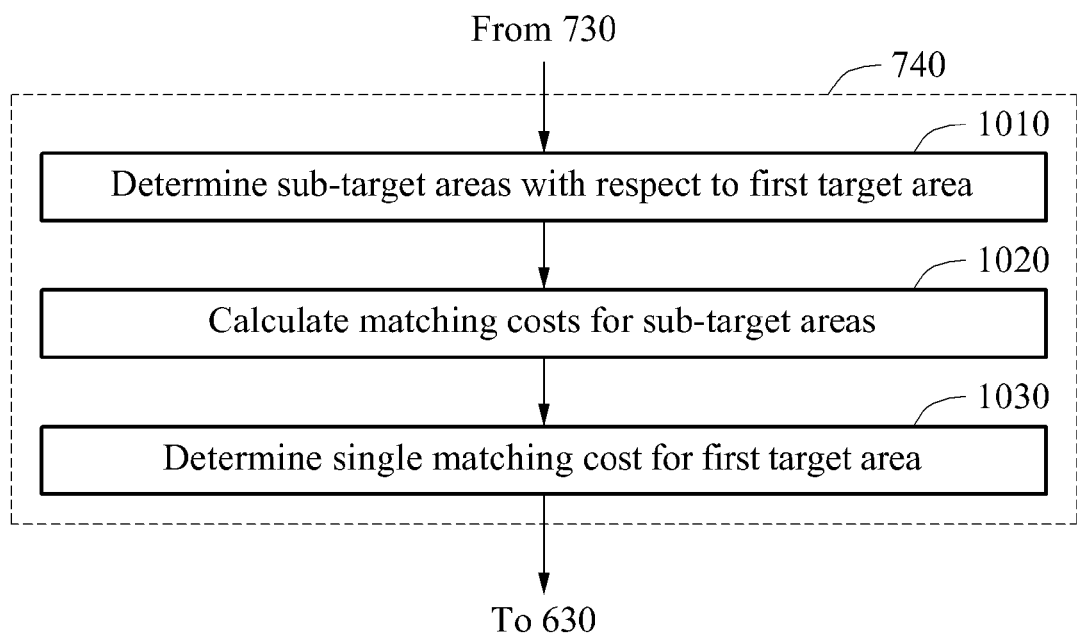
FIG. 10 is a flowchart illustrating a method to calculate a matching cost between a reference area and a target area, in accordance with an embodiment.

FIG. 10 is a flowchart illustrating a method to calculate a matching cost between a reference area and a target area, in accordance with an embodiment.

Referring to FIG. 10, operation 740 of FIG. 7 includes operations 1010, 1020, and 1030.

In operation 1010, the processor 220 determines one or more sub-target areas with respect to a first target area. For example, the sub-target areas are included in the first target area, and sizes of the sub-target areas are smaller than a size of the first target area. In an alternative embodiment, the sub-target areas may be equal to the size of the first target area.

In operation 1020, the processor 220 calculates matching costs for the sub-target areas.

The processor 220 calculates a matching cost between the reference area and each of the sub-target areas.

For example, the processor 220 calculates a matching degree between texture characteristics of the reference area and each of the sub-target areas as the matching cost. The processor 220 calculates a matching degree between a texture area including a first pixel at a center thereof, and a texture area including a corresponding pixel at a center thereof.

As another example, the processor 220 calculates the matching costs as a similarity in distribution of a color value or a gray value between the reference area and each of the sub-target areas. A sum of squared differences (SSD) in gray value between pixels, a sum of absolute differences (SAD) in gray value between pixels, a normalized cross-correlation (NCC), and a zero-mean normalized cross-correlation (ZNCC) are calculated as matching costs.

As still another example, the processor 220 calculates a matching degree between a phase including the first pixel at a center thereof, and a phase including the corresponding pixel at a center thereof.

As yet another example, the processor 220 calculates a matching degree between a vector including the first pixel at a center thereof, and a vector including the corresponding pixel at a center thereof.

In operation 1030, the processor 220 determines a single matching cost for the first target area based on the calculated matching costs.

For example, the processor 220 determines a highest matching cost among the matching costs calculated with respect to the sub-target areas.

As another example, the processor 220 determines a lowest matching cost among the matching costs calculated with respect to the sub-target areas.

Similar to the first target area, the processor 220 determines a single matching cost for a second target area by performing operations 1010 through 1030 with respect to the second target area.

Figure 11:
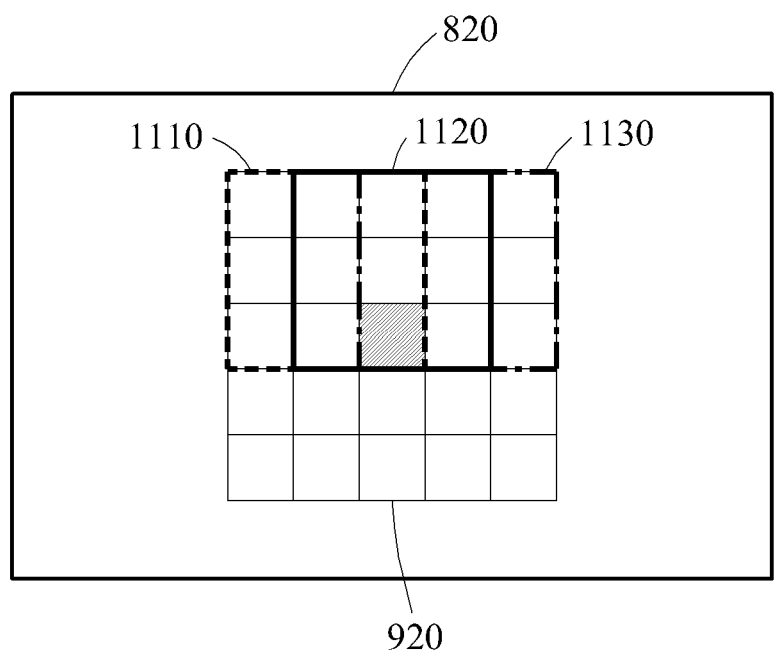
FIG. 11 illustrates sub-target areas in a target area, in accordance with an embodiment.

FIG. 11 illustrates sub-target areas in a target area, in accordance with an embodiment.

Referring to FIG. 11, a size of the target area 920 set in the second image 820 is greater than or equal to a size of the reference area 910 (FIG. 9).

The processor 220 determines the size of the target area 920 based on a parallel movement amount.

For example, the parallel movement amount is determined based on a sampling interval of a range of a depth value. As the sampling interval increases, the parallel movement amount increases. Conversely, as the sampling interval decreases, the parallel movement amount decreases.

In a case in which the size of the reference area 910 is S×S and the parallel movement amount is T, the processor 220 determines the size of the target area 920 to be (S+2*T)×(S+2*T). In this example, S and T are natural numbers.

The processor 220 sets one or more sub-target areas 1110, 1120, and 1130 in the target area 920. In accordance with one illustrative example, a total of nine sub-target areas may be set.

Sizes of the sub-target areas 1110 through 1130 are equal to the size of the reference area 910. Each of the sub-target areas 1110 through 1130 is set to include the corresponding pixel 822. The sub-target areas 1110 through 1130 include the corresponding pixel 822 at different positions.

Figure 12:
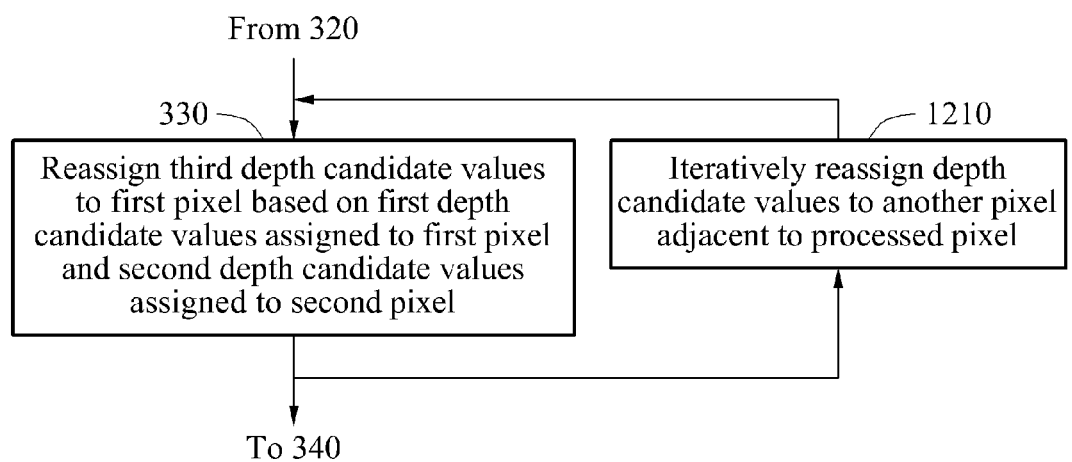
FIGS. 12 and 13 are flowcharts illustrating a method to iteratively reassign depth candidate values to another pixel adjacent to a processed pixel, in accordance with an embodiment.
Figure 13:
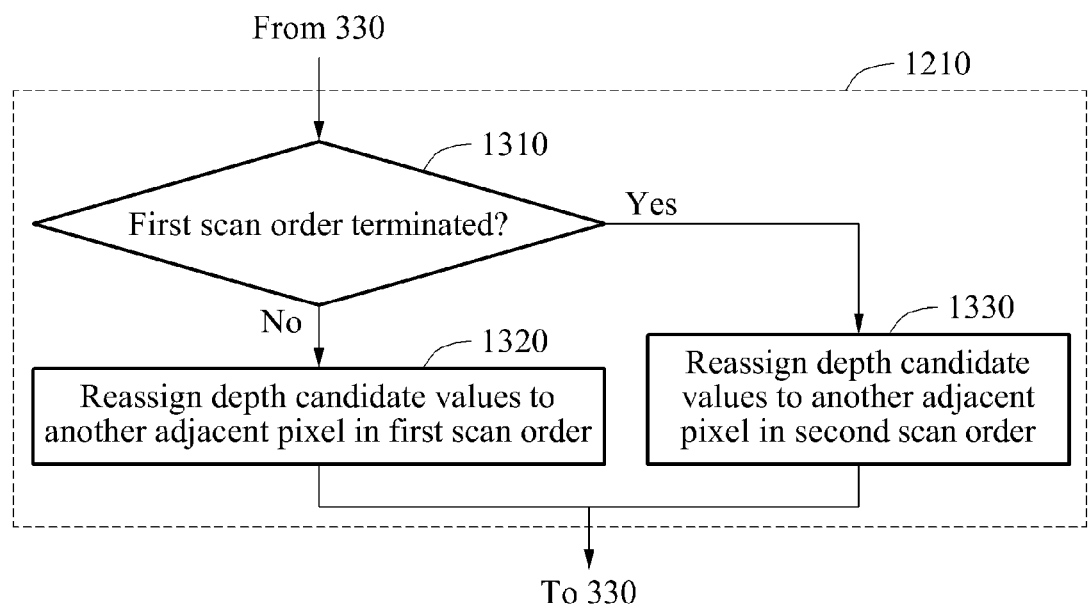

FIGS. 12 and 13 are flowcharts illustrating a method to iteratively reassign depth candidate values to another pixel adjacent to a processed pixel, in accordance with an embodiment.

Referring to FIG. 12, in operation 1210, the processor 220 iteratively reassigns a plurality of depth candidate values to another pixel adjacent to a first pixel.

Operation 1210 is an operation of iteratively re-executing operation 330 of FIG. 3 by changing a pixel to be processed. Operation 330 is performed with respect to the first pixel, and operation 330 is re-executed with respect to another pixel adjacent to the first pixel. The other adjacent pixel to be processed is a pixel yet to be reassigned a depth candidate value.

For example, operation 1210 is performed with respect to all pixels in a first image.

As another example, operation 1210 is performed with respect to all pixels in the first image and a second image.

An order in which operation 1210 is performed with respect to pixels is defined as a scan order.

The scan order includes a left-to-right row sequential scan order, a right-to-left row sequential scan order, a top-to-bottom column sequential scan order, and a bottom-to-top column sequential scan order.

The processor 220 performs operation 1210 multiple times using different scan orders. In an alternative configuration, the processor 220 performs operation 1210 multiple times using the same scan order. A method to perform operation 1210 multiple times will be described in detail with reference to FIG. 13.

Referring to FIG. 13, operation 1210 includes operations 1310, 1320, and 1330.

In operation 1310, the processor 220 determines whether a first scan order is terminated.

For example, the processor 220 determines that the first scan order is terminated in a case in which depth candidate values are reassigned to all pixels in a first image.

In response to determining that the first scan order is yet to be terminated, in operation 1320, the processor 220 reassigns depth candidate values to another pixel adjacent to a processed pixel in the first scan order.

In response to determining that the first scan order is terminated, in operation 1320, the processor 220 reassigns depth candidate values to a first pixel in an image in a second scan order. For example, the second scan order is different from the first scan order.

In a case in which operation 1330 is performed for a first time, a plurality of depth candidate values are initially assigned to a pixel in the first image and a second image. For example, M depth candidate values are initially assigned. Execution of operation 1330 for the first time is re-executing operation 320 of FIG. 3.

In response to reassigning of depth candidate values to the first pixel in the second scan order, depth candidate values are iteratively reassigned to the other pixel that is adjacent to the processed pixel in the second scan order.

In a case in which the second scan order is terminated, operation 1210 is terminated.

Figure 14:
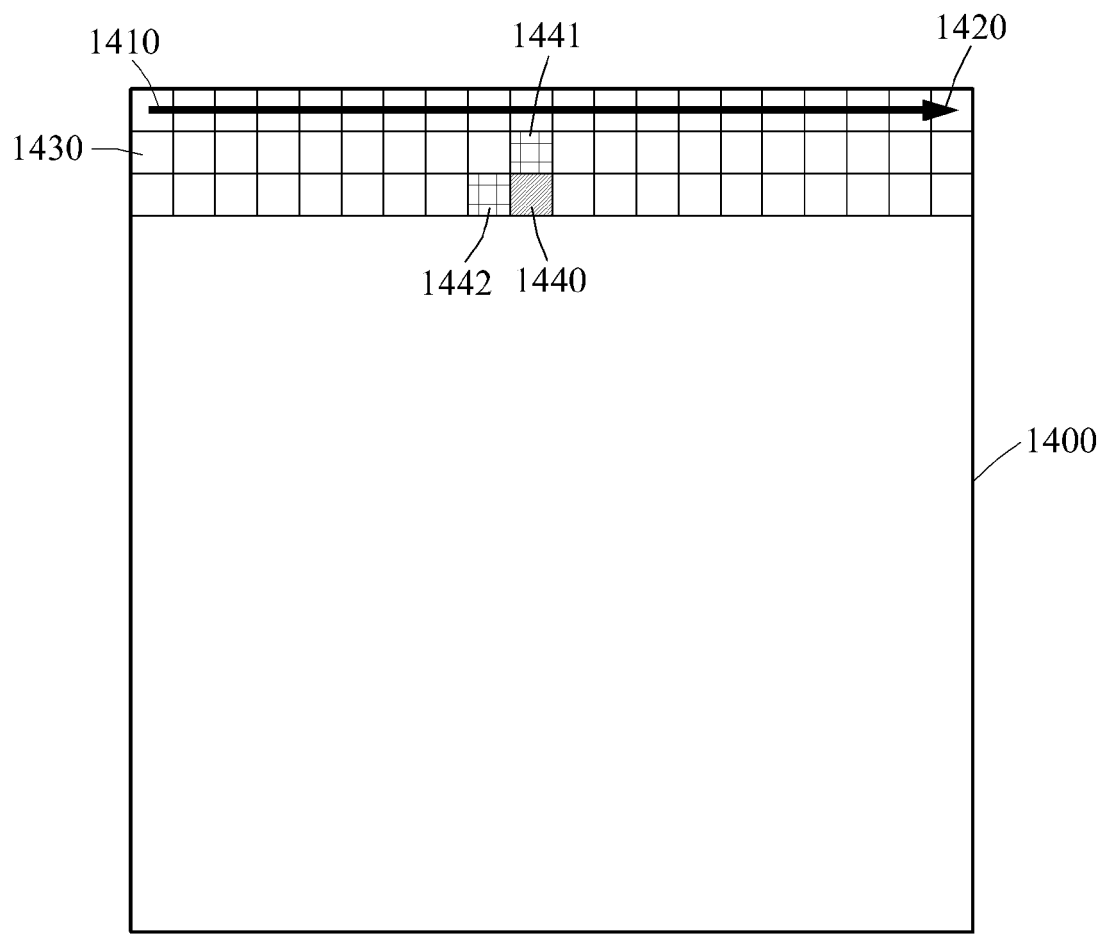
FIG. 14 illustrates a pixel to be processed and pixels adjacent to the pixel to be processed in a scan order of pixels, in accordance with an embodiment.

FIG. 14 illustrates an example of a pixel to be processed and pixels adjacent to the pixel to be processed in a scan order of pixels.

Referring to FIG. 14, the illustrated scan order is a left-to-right row sequential order.

In an image 1400, a first pixel to be processed based on a scan order is a pixel 1410. Depth candidate values are reassigned to the pixel 1410, and pixels are processed in a direction of an arrow.

When a pixel 1420 of a first row is processed, a leftmost pixel 1430 of a second row is processed. In an example, all pixels in the image 140 are processed in an order as previously described.

For example, a pixel 1440 is a pixel to be processed, for example, the first pixel. In this example, a pixel 1441 and a pixel 1442 are second pixels adjacent to the pixel to be processed. The pixel 1441 and the pixel 1442 are pixels already processed based on the scan order.

Such a relationship varies depending on the scan order.

Figure 15:
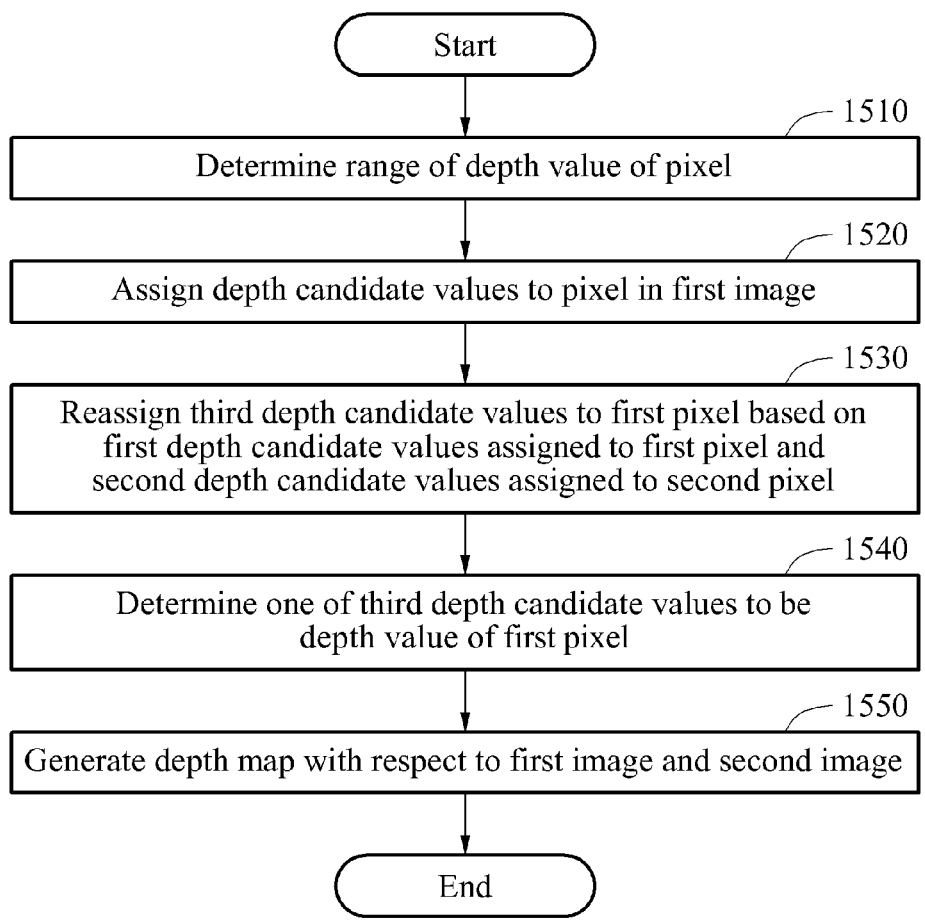
FIG. 15 is a flowchart illustrating a method to generate a depth map of a 3D image, in accordance with an embodiment.

FIG. 15 is a flowchart illustrating a method to generate a depth map of a 3D image, in accordance with an embodiment.

Referring to FIG. 15, a depth map of a 3D image is generated through operations 1510, 1520, 1530, 1540, and 1550.

Descriptions about operations 310 through 340 of FIG. 3 may be applicable to operations 1510 through 1540, respectively, and thus duplicated descriptions will be omitted for conciseness.

The processor 220 obtains depth values for all pixels in a first image through operations 1510 through 1540.

In operation 1550, the processor 220 generates a depth map with respect to the first image and a second image based on a depth value of a first pixel.

The processor 220 generates a depth map with respect to the first pixel based on the depth values for all pixels in the first image.

The units described herein may be implemented using hardware components. For example, the hardware components may include processors, controllers, application specific integrated circuits, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, a processing device may include multiple processors or a processor and a controller. In addition, different processing configurations are possible, such as parallel processors.

The methods illustrated in FIGS. 3, 4, 6, 7, 10, 12, 13, and 15 that perform the operations described herein with respect to FIGS. 1, 2, 5, 8-9, 11, and 14 are performed by a processor or a computer as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

As a non-exhaustive illustration only, a terminal or device described herein may refer to mobile devices such as a cellular phone, a personal digital assistant (PDA), a digital camera, a portable game console, and an MP3 player, a portable/personal multimedia player (PMP), a handheld e-book, a portable laptop PC, a global positioning system (GPS) navigation, a tablet, a sensor, and devices such as a desktop PC, a high definition television (HDTV), an optical disc player, a setup box, a home appliance, and the like that are capable of wireless communication or network communication consistent with that which is disclosed herein.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An image matching method, comprising:
assigning first depth candidate values to a first pixel in a first image;
reassigning third depth candidate values to the first pixel in the first image based on the first depth candidate values assigned to the first pixel and second depth candidate values assigned to a second pixel adjacent to the first pixel;
determining one of the third depth candidate values to be a depth value of the first pixel;
matching the first pixel and a third pixel in a second image corresponding to the determined depth value of the first pixel,
wherein the first image and the second image are stereoscopic images; and
generating an image from a virtual viewpoint based on the matched first pixel and third pixel.

2. The method of claim 1, further comprising:
determining a range of the depth value of the first pixel in the first image.

3. The method of claim 1, wherein a number of the third depth candidate values is equal to a number of the second depth candidate values.

4. The method of claim 2, wherein the determining of the range of the depth value comprises:
determining a minimum value and a maximum value of the range of the depth value; and
determining a sampling interval of the depth value.

5. The method of claim 2, wherein the determining of the range of the depth value is based on structure characteristics of the first image and the second image.

6. The method of claim 2, wherein the assigning comprises randomly assigning depth values within the range of the depth value to the first pixel as the first depth candidate values.

7. The method of claim 1, wherein the reassigning comprises:
generating a set of depth candidate values for the first pixel based on the first depth candidate values and the second depth candidate values;
calculating matching costs for the set of depth candidate values;
determining the third depth candidate values based on the matching costs; and
reassigning the third depth candidate values to the first pixel.

8. The method of claim 7, wherein the determining of the third depth candidate values is performed in an ascending order of the calculated matching costs.

9. The method of claim 7, wherein the calculating comprises:
determining pixels corresponding to the first pixel in the second image with respect to each of the set of depth candidate values;
setting a reference area comprising the first pixel in the first image;
setting target areas comprising the corresponding pixels; and
calculating a matching cost between the reference area and each of the target areas.

10. The method of claim 9, wherein the calculating of the matching cost between the reference area and each of the target areas comprises calculating a matching degree between texture characteristics of the reference area and each of the target areas.

11. The method of claim 9, wherein the setting of the target areas comprises determining a size of a target area based on a preset parallel movement amount.

12. The method of claim 10, wherein the calculating of the matching cost between the reference area and each of the target areas comprises:
determining a sub-target area with respect to a first target area of the target areas;
calculating a matching cost for the sub-target area and the reference area; and
determining a single matching cost for the first target area based on the calculated matching cost for the sub-target area.

13. The method of claim 1, further comprising:
iteratively reassigning depth candidate values to another pixel adjacent to the first pixel.

14. The method of claim 13, wherein the iteratively reassigning is performed with respect to all pixels in the first image in a first scan order.

15. The method of claim 14, wherein the first scan order is one of a left-to-right row sequential scan order, a right-to-left row sequential scan order, a top-to-bottom column sequential scan order, or a bottom-to-top column sequential scan order.

16. The method of claim 14, wherein
the iteratively reassigning is further performed with respect to all pixels in the first image in a second scan order, and
the second scan order is different from the first scan order.

17. The method of claim 1, wherein the determining of the one of third depth candidate values to be the depth value of the first pixel is based on an energy function.

18. A non-transitory computer-readable storage medium comprising a program comprising instructions to cause a computer to perform the method of claim 1.

19. An image matching apparatus, comprising:
a storage configured to store a first image and a second image; and
a processor configured to
assign first depth candidate values to a first pixel in a first image,
reassign third depth candidate values to the first pixel in the first image based on the first depth candidate values assigned to the first pixel and second depth candidate values assigned to a second pixel adjacent to the first pixel,
determine one of the third depth candidate values to be a depth value of the first pixel,
match the first pixel and a third pixel in a second image corresponding to the determined depth value of the first pixel,
wherein the first image and the second image are stereoscopic images; and
generate an image from a virtual viewpoint based on the matched first pixel and third pixel.

20. A method to generate a depth map of a three-dimensional (3D) image, the method comprising:
assigning first depth candidate values to a first pixel in a first image;
reassigning third depth candidate values to the first pixel in the first image based on the first depth candidate values assigned to the first pixel and second depth candidate values assigned to a second pixel adjacent to the first pixel;

determining one of the reassigned third depth candidate values to be a depth value of the first pixel; and generating a depth map with respect to the first image and a second image based on the depth value of the first pixel, wherein the first image and the second image are stereoscopic images, and wherein the depth map is used to generate an image from a virtual viewpoint.

* * * * *